United States Patent
Yen et al.

(10) Patent No.: US 6,895,116 B2
(45) Date of Patent: May 17, 2005

(54) AUTOMATICALLY EXTRACTING GRAPHICAL BAR CODES

(75) Inventors: Jonathan Yen, San Jose, CA (US); Doron Shaked, Haifa (IL); Avi Levy, Tivon (IL); Renato Keshet, Haifa (IL)

(73) Assignee: Hewlett-Packard Development Company, L.P., Houston, TX (US)

( * ) Notice: Subject to any disclaimer, the term of this patent is extended or adjusted under 35 U.S.C. 154(b) by 522 days.

(21) Appl. No.: 09/877,581

(22) Filed: Jun. 7, 2001

(65) Prior Publication Data

US 2002/0196979 A1 Dec. 26, 2002

(51) Int. Cl.[7] .................................. G06K 9/48
(52) U.S. Cl. .................. 382/199; 382/168; 382/296; 235/462.01
(58) Field of Search .................. 382/190, 203, 382/168, 155, 295, 296; 235/462.01–462.16

(56) References Cited

U.S. PATENT DOCUMENTS

| | | | |
|---|---|---|---|
| 4,777,357 A | | 10/1988 | Harada |
| 4,822,986 A | * | 4/1989 | Guthmueller et al. ... 235/462.02 |
| 4,901,073 A | * | 2/1990 | Kibrick ............... 341/13 |
| 4,948,955 A | | 8/1990 | Lee |
| 5,120,940 A | * | 6/1992 | Willsie ............... 235/462.08 |
| 5,337,361 A | | 8/1994 | Wang |
| 5,418,862 A | * | 5/1995 | Zheng et al. ............. 382/199 |
| 5,523,552 A | * | 6/1996 | Shellhammer et al. . 235/462.09 |
| 5,550,365 A | * | 8/1996 | Klancnik et al. ...... 235/462.25 |
| 5,682,030 A | * | 10/1997 | Kubon ............... 235/462.25 |
| 5,835,615 A | * | 11/1998 | Lubow et al. ............. 382/112 |
| 5,862,270 A | * | 1/1999 | Lopresti et al. ............ 382/306 |
| 5,880,451 A | * | 3/1999 | Smith et al. ............. 235/462.1 |
| 5,946,415 A | * | 8/1999 | Su et al. ................ 382/190 |
| 6,082,619 A | | 7/2000 | Ma |
| 6,193,158 B1 | * | 2/2001 | Hecht et al. ........... 235/462.16 |
| 6,201,901 B1 | * | 3/2001 | Zhou et al. ................ 382/306 |
| 6,212,504 B1 | * | 4/2001 | Hayosh ................. 705/64 |
| 6,366,696 B1 | * | 4/2002 | Hertz et al. ............ 382/183 |
| 6,470,096 B2 | * | 10/2002 | Davies et al. ........... 382/203 |
| 6,565,003 B1 | * | 5/2003 | Ma ................ 235/462.1 |

FOREIGN PATENT DOCUMENTS

| | | |
|---|---|---|
| EP | 0449634 A2 | 10/1991 |
| EP | 0962883 A2 | 12/1999 |

\* cited by examiner

Primary Examiner—Bhavesh M. Mehta
Assistant Examiner—Sheela C Chawan

(57) ABSTRACT

Systems and methods for automatically extracting a graphical bar code (i.e., an image that contains inconspicuous graphical modulations that encode embedded information) are described. In accordance with this automatic extraction scheme, a graphical bar code may be isolated from a composite image in a way that preserves the information-containing graphical modulations encoding the embedded information and avoids corrupting artifacts, such as markings contained in the composite image. The resulting extracted graphical bar code readily may be processed into a format that is tailored to the requirements of a decoding system that may be particularly sensitive to noise, such as extraneous markings and image corruption. In addition, this automatic extraction scheme robustly handles missed and incorrect detections.

29 Claims, 6 Drawing Sheets

AUTOMATICALLY EXTRACTING GRAPHICAL BAR CODES

CROSS-REFERENCE TO RELATED APPLICATIONS

This application relates to the following co-pending applications, each of which is incorporated herein by reference: U.S. patent application Ser. No. 09/579,070, filed May 25, 2000, by Doron Shaked et al., and entitled "A Method and Apparatus for Generating and Decoding a Visually Significant Bar Code;" U.S. patent application Ser. No. 09/429,515, filed Oct. 28, 1999 by Renato Keshet et al., and entitled "System and Method for Counterfeit Protection;" U.S. Ser. No. 09/728,292, filed Dec. 1, 2000, by Jonathan Yen et al., and entitled "Authenticable Graphical Bar Codes;" and U.S. Ser. No. 09/877,516, filed on even date herewith, by Doron Shaked et al., and entitled "Generating and Decoding Graphical Bar Codes".

TECHNICAL FIELD

This invention relates to systems and methods for automatically extracting graphical bar codes.

BACKGROUND

A typical bar code symbol is a pattern of parallel bars and spaces of various widths that represent data elements or characters. The bars represent strings of binary ones and the spaces represent strings of binary zeros. A conventional "one-dimensional" bar code symbol contains a series of bars and spaces that vary only in a single dimension. One-dimensional bar code symbols have relatively small information storage capacities. "Two-dimensional" bar codes have been developed to meet the increasing need for machine-readable symbols that contain more information than one-dimensional bar code symbols. The information storage capacity of two-dimensional bar code symbols is increased relative to one-dimensional bar codes by varying the bar code patterns in two dimensions. Common two-dimensional bar code standards include PDF417, Code 1, and Maxicode. One-dimensional and two-dimensional bar code symbols typically are read by optical scanning techniques (e.g., by mechanically scanned laser beams or by self-scanning charge-coupled devices (CCD's)) that convert a printed bar code symbol into electrical signals. The electrical signals are digitized and decoded to recover the data encoded in the printed bar code symbol.

Bar codes may be used in a variety of applications, including low information content applications (e.g., automatic price tagging and inventory management), and relatively high information content applications (e.g., encoding mail addresses and postage for automated mail reading and mail distribution systems, and encoding compressed content of a printed page).

SUMMARY

As used herein, the term "graphical bar code" broadly refers to an image that contains inconspicuous graphical modulations that encode embedded information.

The invention features an inventive scheme (systems and methods) for automatically extracting graphical bar codes from an input image. In particular, the invention enables a graphical bar code to be isolated from a composite image in a way that preserves the information-containing graphical modulations encoding the embedded information and avoids corrupting artifacts, such as markings contained in the composite image. The resulting extracted graphical bar code readily may be processed into a format that is tailored to the requirements of a decoding system that may be particularly sensitive to noise, such as extraneous markings and image corruption. In addition, the inventive automatic extraction scheme robustly handles missed and incorrect detections.

In one aspect of the invention, non-graphical bar code regions are trimmed from the input image based upon estimated position coordinates for a detected graphical bar code candidate to produce a trimmed graphical bar code candidate for decoding.

Embodiments of the invention may include one or more of the following features.

In some embodiments, the input image is cropped before trimming based upon estimated position coordinates for a detected graphical bar code candidate to produce an inclusive image region encompassing the detected graphical bar code.

In some embodiments, the angular orientation of the detected graphical bar code candidate is computed. The non-graphical bar code regions may be trimmed based upon intensity histogram profiles obtained by summing intensity values along orthogonal axes corresponding to the computed angular orientation of the detected graphical bar code candidate. For example, the non-graphical bar code regions may be trimmed based upon application of a threshold to the intensity histogram profiles. The non-graphical bar code regions also may be trimmed based upon a comparison of expected graphical bar code dimensions with the intensity histogram profiles.

The detected graphical bar code candidate preferably is de-skewed before the non-graphical bar code regions are trimmed.

The input image preferably is processed to detect a graphical bar code candidate. The input image may be rotated and the rotated input image may be processed to detect a graphical bar code candidate in response to a failure to detect a graphical bar code candidate in the input image before rotation. The graphical bar code candidate may be detected based upon a second training sample in response to a failure to detect a graphical bar code candidate in the input image based upon a first training sample. The second training sample may be a rotated version of the first training sample. A second graphical bar code candidate detected in the input image may be extracted in response to a determination that a first extracted graphical bar code candidate does not correspond to the graphical bar code.

The trimmed graphical bar code candidate also may be resolution scaled.

Other features and advantages of the invention will become apparent from the following description, including the drawings and the claims.

DETAILED DESCRIPTION

In the following description, like reference numbers are used to identify like elements. Furthermore, the drawings are intended to illustrate major features of exemplary embodiments in a diagrammatic manner. The drawings are not intended to depict every feature of actual embodiments nor relative dimensions of the depicted elements, and are not drawn to scale.

Figure 1:
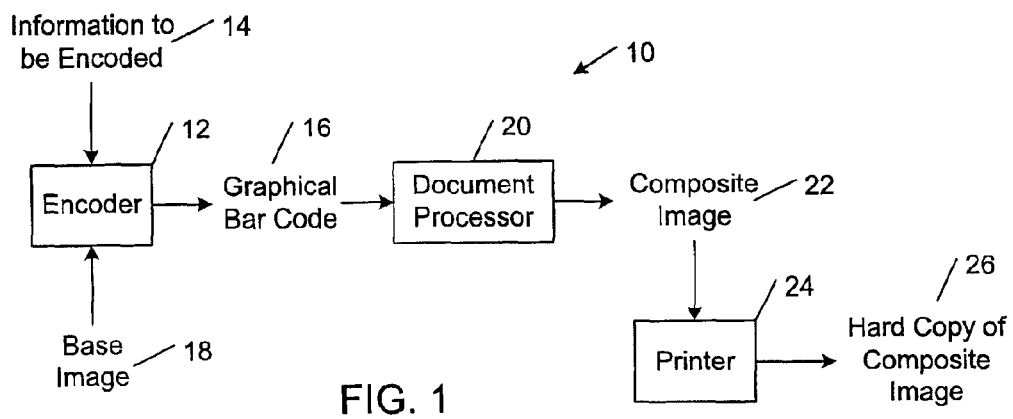
FIG. 1 is a block diagram of a system for incorporating into a composite image a graphical bar code containing encoded information and for printing a hard copy of the composite image.

Referring to FIG. 1, in one embodiment, a system 10 for incorporating a graphical bar code into a composite image includes an encoder 12 that is configured to encode information 14 into a graphical bar code 16. Encoder 12 may be implemented as one or more program modules that are executable on a computer or other programmable processor. As explained in detail below, encoder 12 modulates a base image 18 with a graphical encoding of information 14 to produce graphical bar code 16. Base image 18 may be any graphical pattern, including a logo (e.g., a company logo), graphics, pictures, text, images, or any pattern that has visual significance. Information 14 may be embedded in the graphical design of text, pictures, images, borders, or the background of base image 18 to produce graphical bar code 16. Information 14 may be embedded in graphical bar code 16 in the form of a binary image (e.g., a black and white dot pattern), a multilevel image (e.g., a gray-level image), or a multilevel color image. System 10 also includes a document processor 20 that is configured to incorporate graphical bar code 16 into a composite image 22. Document processor 20 may be a conventional word processing application program or other document processing application program. System 10 may include a printer 24 for producing a hard copy 26 of composite image 22. Printer 24 may be a conventional printer (e.g., a LaserJet® printer available from Hewlett-Packard Company of Palo Alto, Calif., U.S.A.) or a special-purpose label printing device. Hard copy 26 may be in the form of any one of a wide variety of printed materials, including a bank draft (or check) carrying a graphical bar code of a withdrawal authorization signature, a stock certificate or bond carrying a graphical bar code of an authenticity certification, and an envelope carrying a graphical bar code of postage indicia. In other embodiments, composite image 22 may be rendered by other printing processes. For example, in some embodiments, graphical bar code 16 may be in the form of a tag that may be attached physically to a document to produce composite image 22. Composite image 22 also may be rendered in an electronic format.

In some embodiments, rather than embedding information 14 directly into base image 18, encoder 12 may be programmed to generate from information 14 a corroborative signed message, which then may be incorporated into graphical bar code 16. Such a corroborative signed message may be generated by the encoding process described in U.S. Ser. No. 09/728,292, filed Dec. 1, 2000, by Jonathan Yen et al., and entitled "Authenticable Graphical Bar Codes."

Figure 2A:
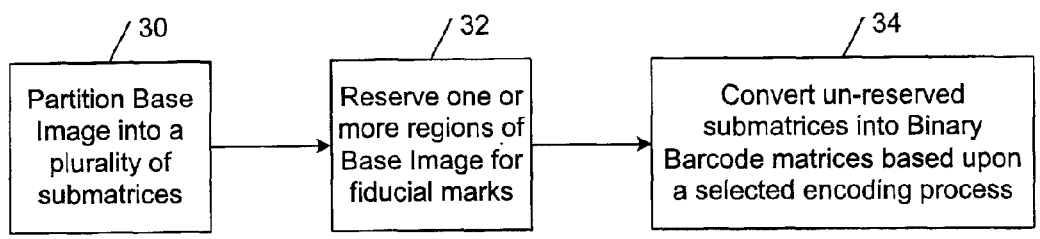
FIG. 2A is a flow diagram of a method of rendering a base image with a graphical encoding of information.
Figure 2B:
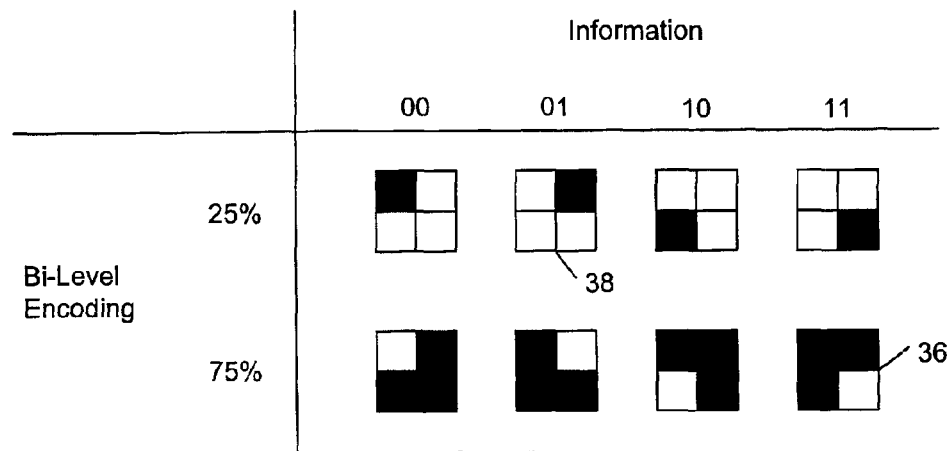
FIG. 2B is a table mapping information to a two-bit bi-level graphical code.

Referring to FIGS. 2A and 2B, graphical bar code 16 may be produced by graphically modulating base image 18 in accordance with the graphical encoding scheme described in co-pending U.S. patent application Ser. No. 09/579,070, filed May 25, 2000, by Doron Shaked et al., and entitled "A Method and Apparatus for Generating and Decoding a Visually Significant Bar code." In accordance with this graphical encoding process, base image 18 is partitioned into a plurality of sub-matrices (step 30). One or more regions of base image 18 are reserved for fiducial markings (step 32). Un-reserved sub-matrices are converted into binary bar code matrices based upon a selected graphical encoding process (step 34). For example, in one graphical encoding embodiment, information 14 may be encoded into a bi-level image by a two-bit encoding process based upon the two-by-two halftone patterns (or matrices) illustrated in FIG. 2B. In accordance with this graphical encoding process, sub-matrices in base image 18 undergo a thresholding process and a bi-level half-toning process. For example, in one embodiment, sub-matrices in base image 18 that have a gray level that is less than 50% are encoded with one of the four bar code matrices in the 25% row of FIG. 2B. Sub-matrices in base image 18 that have a gray level that is at least 50% are encoded with one of the four bar code matrices in the 75% row of FIG. 2B. In other embodiments, the encoding threshold level may be greater than or less than 50%. The particular bar code matrix used to render a sub-matrix of base image 18 is selected based upon the information to be encoded. For example, if "11" is to be encoded at a 75% gray level sub-matrix location, bar code matrix 36 is used to render that sub-matrix. Similarly, if "01" is to be encoded at a 25% gray level sub-matrix location, bar code matrix 38 is used to render that sub-matrix.

In general, the graphical encoding process of FIGS. 2A and 2B may be extended to n-bit encoding mappings, where n has an integer value of 1 or greater. For example, in one embodiment, information is encoded by a five-bit encoding process based upon three-by-three halftone patterns. In other embodiments, graphical bar code 16 may be produced by graphically modulating base image 18 in accordance with the graphical encoding scheme described in co-pending U.S. patent application Ser. No. 09/877,516, filed on even day herewith, by Doron Shaked et al., and entitled "Generating and Decoding Graphical Bar Codes".

Figure 3:
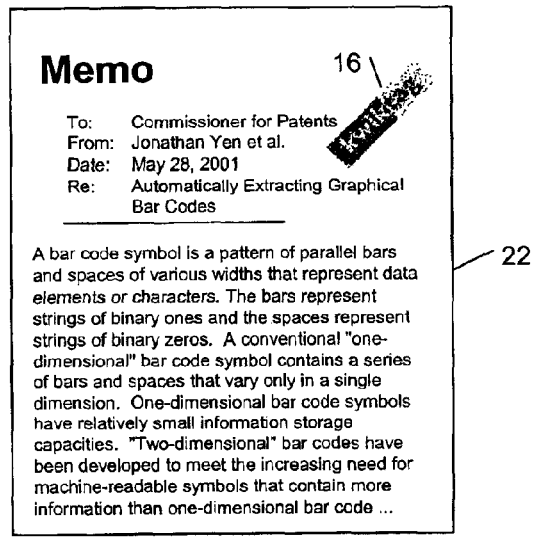
FIG. 3 is a diagrammatic view of a composite image produced by the system of FIG. 1.

Referring to FIG. 3, the resulting composite image 22 may be in the form of any one of a wide variety of images. For example, in this particular illustrative embodiment, composite image 22 is in the form of a memorandum document. Graphical bar code 16 may be incorporated into composite image 22 in any one of a wide variety of ways. For example, graphical bar code 16 may be located anywhere in composite image 22 and may be oriented at any angle. In the embodiment of FIG. 3, graphical bar code 16 is located in the upper right corner of composite image 22 and is rotated 45° counterclockwise relative to the normal (or upright) orientation of composite image 22. Graphical bar code 16 preferably is positioned in a composite image region that is free of other markings (i.e., a "white" image region); although, graphical bar code 16 advertently or inadvertently may be positioned over marked regions of composite image 22. In some embodiments, graphical bar code 16 may be incorporated into composite image 22 with a surrounding marking-free (or white) border region to improve the accuracy and robustness of the automatic extraction process described below. It is noted that the location and angular orientation of graphical bar code 16 may change during handling of hard copies 26 of composite image 22. For example, over time, one or several successive copying or scanning operations may change the location of graphical bar code 16 or the angular orientation of graphical bar code 16, or both.

Figure 4:
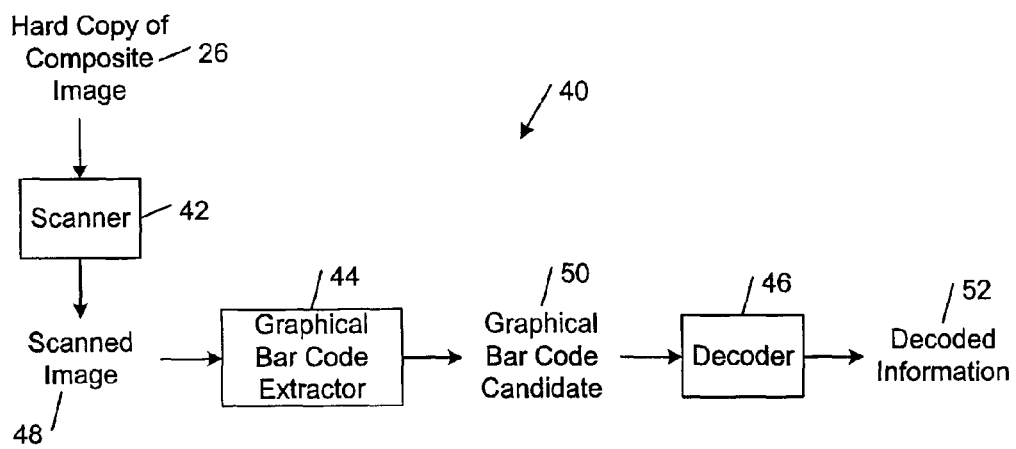
FIG. 4 is a block diagram of a system for automatically extracting a graphical bar code from a hard copy of a composite image and for decoding information from the extracted graphical bar code.

As shown in FIG. 4, in one embodiment, a system 40 for automatically extracting information 14 from graphical bar code 16 includes a scanner 42, a 30 graphical bar code extractor 44, and a decoder 46. Scanner 42 may be a conventional desktop optical scanner (e.g., a ScanJet® scanner available from Hewlett-Packard Company of Palo Alto, Calif., U.S.A.), a portable scanner (e.g., a CapShare® portable scanner available from Hewlett-Packard Company of Palo Alto, Calif., U.S.A.), or a conventional facsimile machine. Graphical bar code extractor 44 and decoder 46 may be in the form of one or more program modules that are operable on a computer or other programmable processor. In operation, scanner 42 reads hard copy 26 to produce a digitized scanned image 48. Graphical bar code extractor 44 determines the location and angular orientation of one or more graphical bar code candidates 50 that are detected within scanned image 48, and extracts the graphical bar code candidates 50 from composite image 22. In some embodiments, decoder 46 extracts information 14 from graphical bar code candidates 50 based upon a comparison of graphical bar code candidates 50 and base image 18. In embodiments in which information 14 is encoded into a corroborative signed message, decoder 46 may be configured to decode the signed message to produce a decoded message 52. The resulting signed message then may be decoded using a conventional error correction code decoding process.

As explained above, the unique way in which information is encoded in graphical bar code 16 makes the decoding process particularly sensitive to noise, such as extraneous markings and image corruption. Thus, in order to extract information 14 from graphical bar code 16, graphical bar code 16 must be isolated from composite image 22 in a way that preserves the information-containing graphical modulations encoding information 14 by avoiding corruption of graphical bar code 16, for example, by markings contained in composite image 22. In addition, the extracted graphical bar code 16 must be processed into a format that is suitable for decoding. For example, in some embodiments, graphical bar code must be de-skewed and resolution-scaled before it may be processed by decoder 46.

Referring to FIGS. 5–11, in one embodiment, graphical bar code extractor 44 may extract automatically one or more graphical bar code candidates from composite image 22, as follows.

Figure 5:
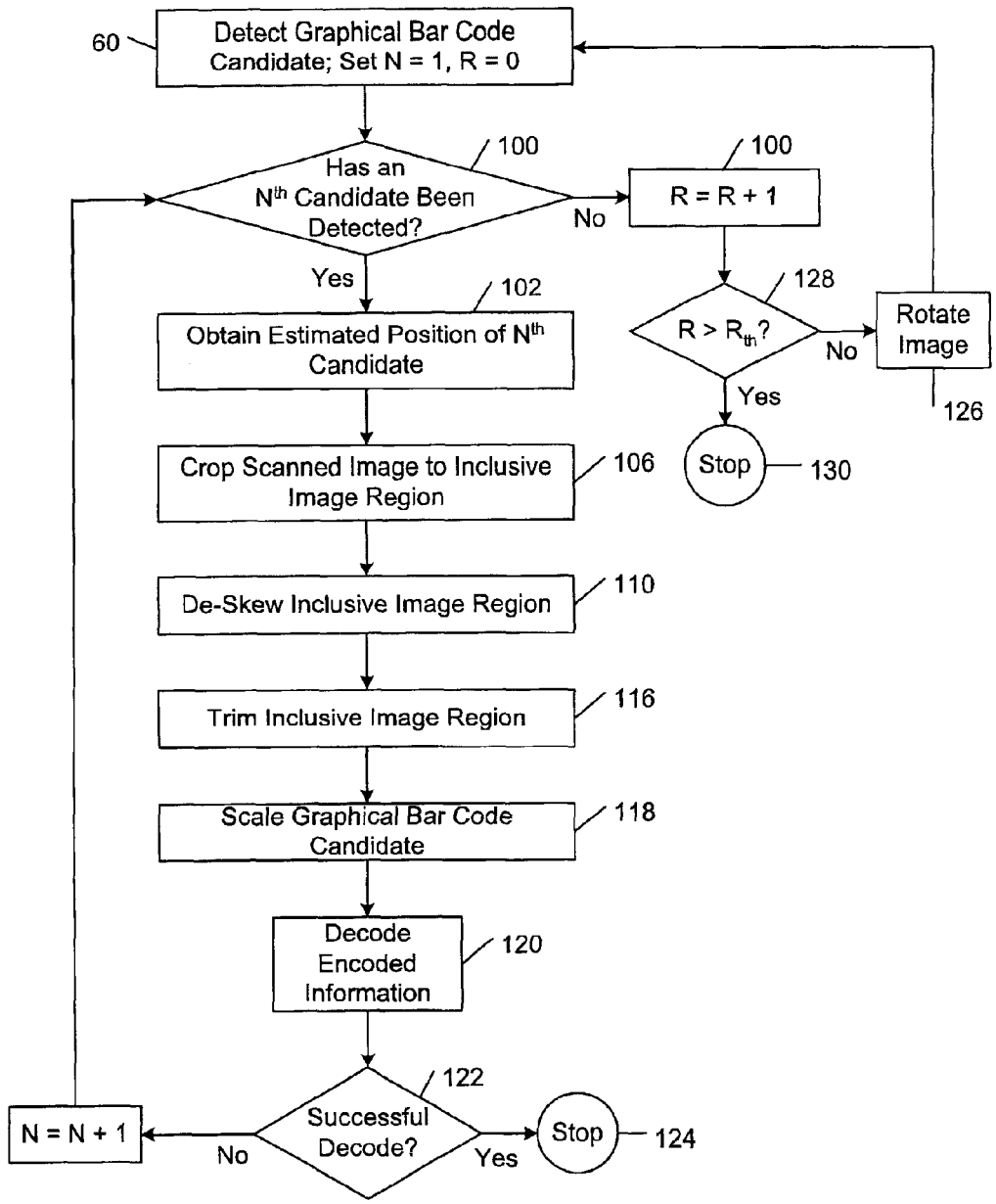
FIG. 5 is a flow diagram of a method of automatically extracting a graphical bar code from a composite image.
Figure 6:
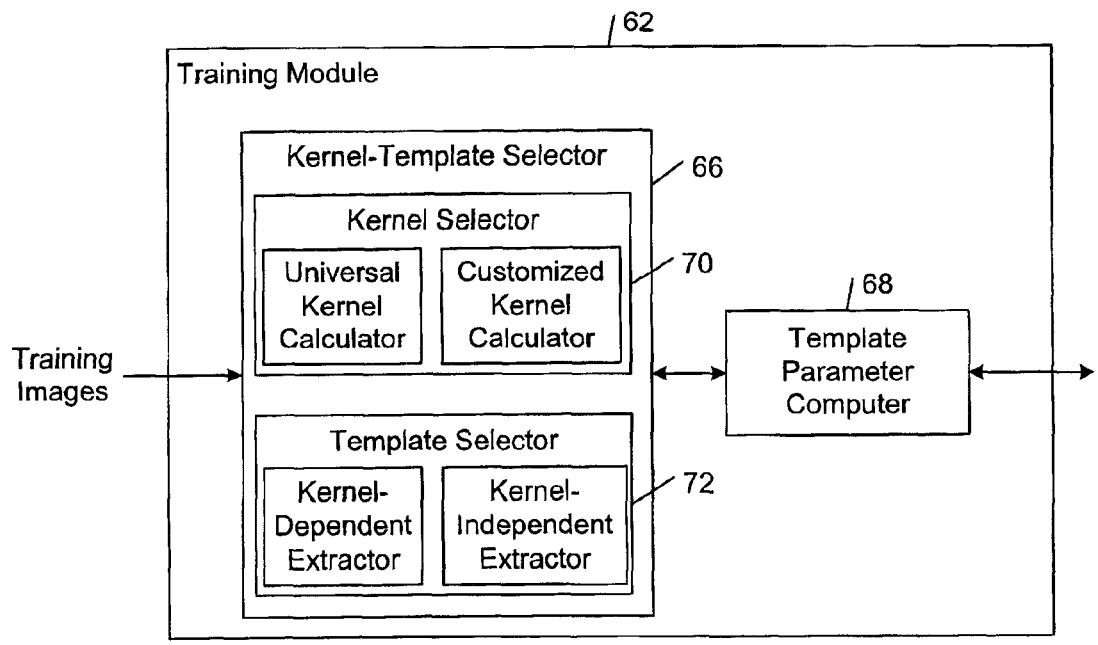
FIG. 6 is a block diagram of a training module of a graphical bar code detection system.
Figure 7:
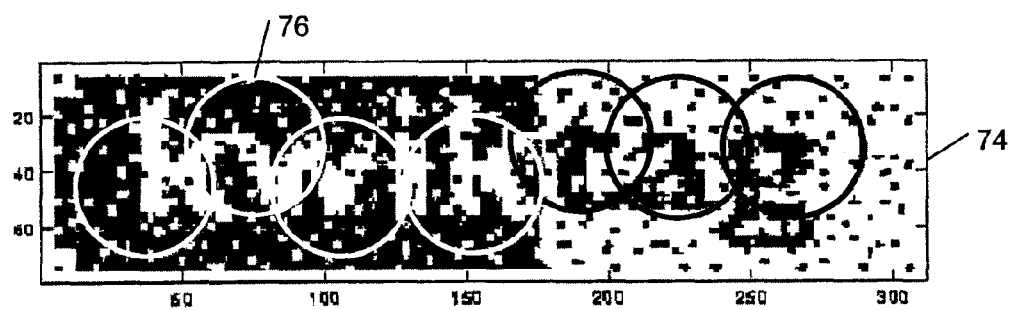
FIG. 7 is a diagrammatic view of a graphical bar code and seven overlying circles defining template regions from which a parameter file that is characteristic of is the graphical bar code may be generated by the training module of FIG. 6.
Figure 8:
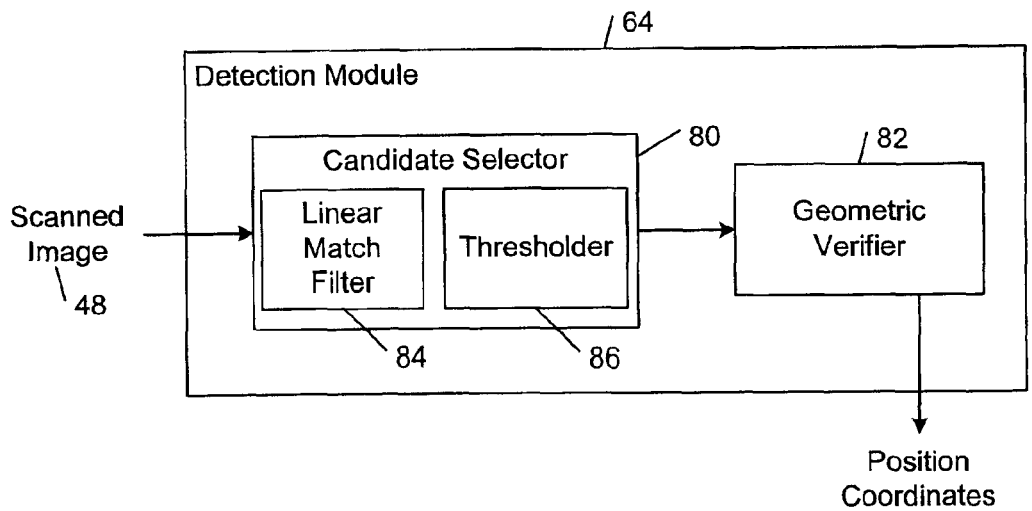
FIG. 8 is a block diagram of a detection module of a graphical bar code detection system.

Referring initially to FIGS. 5–7, graphical bar code extractor 44 first detects a graphical bar code candidate in composite image 22 (step 60; FIG. 5). In one embodiment, the detection process is implemented by the image detection system described in U.S. patent application Ser. No. 09/429,515, filed Oct. 28, 1999 by Renato Keshet et al., and entitled "System and Method for Counterfeit Protection." The image detection system is configured to perform an off-line training procedure and an on-line detection procedure. The training procedure involves deriving from one or more training samples of graphical bar code 16 (indexed by i=0, . . . , L−1) a parameter file that contains detection descriptors for graphical bar code 16. The detection procedure involves processing composite image 22 using the parameter file to determine whether one or more regions of composite image 22 matches graphical bar code 16. The training procedure is implemented by a training module 62 (FIG. 6), and the detection procedure is implemented by a detection module 64 (FIG. 8).

As shown in FIG. 6, training module 62 includes a kernel-template selector 66 and a template parameter computer 68. Kernel-template selector 66 includes a kernel selector 70 and a template selector 72. Kernel selector 70 is configured to select either universal kernels or customized kernels. Template selector 72 is configured to extract either kernel-dependent templates or kernel-independent templates from the graphical bar code training samples. In operation, after kernels and templates have been selected, template parameter computer 68 projects the templates onto the kernels to derive projections values that are used by template parameter computer 68 to define a number of intervals to be used by detection module 64 during the on-line detection procedure. Template parameter computer 68 stores the defined intervals in the parameter file. The parameter file also includes a number of input parameters, the coefficients of the selected kernels, and document parameters. The operation of kernel-template selector 66 may be controlled based upon the input parameters identified in Table 1 below.

TABLE 1

Input parameters for kernel-template selector.

| PARAMETER | DESCRIPTION |
| --- | --- |
| $R_o$ | Resolution of the input image |
| L | The number of templates per graphical bar code |
| N | Kernel size |
| R | Decimation rate (or sub-sampling rate) |
| $K_{ISO}$ | The number of isotropic kernels |
| $K_{NON}$ | The number of non-isotropic kernels |
| C | The number of colors |
| $S_t$ | Template selection type (kernel-independent, kernel-dependent) |
| $S_k$ | Kernel selection type (universal, customized) |
| $F_M$ | Local-maximum flag |
| $F_N$ | Normalization flag |
| $L_e$ | Number of essential templates |

As explained in U.S. patent application Ser. No. 09/429,515, filed Oct. 28, 1999 by Renato Keshet et al., and entitled "System and Method for Counterfeit Protection," templates are circular extracts from the graphical bar code training samples. The number of templates that are used to characterize a given graphical bar code training samples may be selected during the off-line training procedure to obtain a desired tradeoff between detection speed and detection accuracy. The diameter of the templates (in pixels) is given approximately by the product NR, where N and R are the kernel size and the decimation rate, respectively. Because the values of N and R are fixed, a template is uniquely characterized by the position of its center within the graphical bar code training samples. The templates are required to be totally contained within the image, therefore the locus of their centers is an eroded version of the image domain. In particular, if the graphical bar code training samples lies in an a×b rectangle, then the center locus is a concentric (a−NR)×(b−NR) rectangle. This center locus is denoted herein as a "search window." For practical reasons, the search window may be defined as a concentric (a−√2NR)×(b−√2NR) rectangle. This allows rotated versions of templates to be computed.

The kernels are N×N pixel images that are used for linear convolution with an input image (e.g., scanned image 48) that is to be examined during the on-line procedure, to determine whether the input image contains a duplicate of a graphical bar code training samples. The results of such convolutions are analyzed by the detection module during the on-line image detection procedure. It is preferable that each kernel be as close to a circle as possible. There are two types of kernels: isotropic and non-isotropic. The numbers of isotropic and non-isotropic kernels are determined by the input parameters $K_{ISO}$ and $K_{NON}$, respectively. Ideally, the isotropic kernels are 2D real functions that do not depend on the orientation angle (e.g., they are composed of concentric rings). Since sampled functions are utilized to derive the kernels, as explained in U.S. patent application Ser. No. 09/429,515, filed Oct. 28, 1999 by Renato Keshet et al., and entitled "System and Method for Counterfeit Protection," the isotropic kernels are considered to be an approximation of the above-explained ideal concept. The main desired property of these isotropic kernels is that when projecting (by means of inner product) all rotated versions of a given circular image on an isotropic kernel, the result is constant (i.e., does not depend on the rotation angle). Non-isotropic kernels are complex kernels satisfying the following properties: (a) the absolute value of the inner product between the non-isotropic kernel and a rotated version of a given circular image does not depend on the rotation angle; and (b) the phase of the above inner product is equal to a multiple of the rotation angle plus a constant.

As shown in FIG. 7, in one particular illustrative embodiment, seven templates 76 (corresponding to the image portions located within the black and white circles) are selected for a graphical bar code training samples 74. In this embodiment, the following additional input parameters are selected: two isotropic kernels; two non-isotropic kernels; 64 rotational increments; a 4× sub-sampling rate (i.e., R=4); and a kernel size of 9×9 pixels (i.e., N=9). After processing by training module 62, graphical bar code candidates corresponding to graphical bar code training samples 74 may be detected by detection module 64 based upon the parameter file generated by training module 62.

Referring to FIG. 8, in one embodiment, detection module 64 includes a candidate selector 80 and a geometric verifier 82. Candidate selector 80 is configured to receive an input image (e.g., scanned image 48) and the parameter file during an on-line detection procedure. The candidate selector 80 includes a linear match filter 84 and a thresholder 86. The linear match filter 84 is designed to project portions of the input image onto the kernels that were selected during the off-line training procedure. The resulting projection values then are compared by thresholder 86 using the intervals defined in the parameter file. Portions of the input image that satisfy the comparison for all intervals are declared template match candidates. Coordinates of these template match candidates are transmitted to the geometric verifier 82. The geometric verifier 82 is configured to geometrically compare the template match candidates with the templates of the graphical bar code training samples 74 using predefined criteria to determine whether the input image is a duplicate of the graphical bar code training samples. If the predefined criteria are satisfied, the input image is determined to be a duplicate (or a match) of the graphical bar code training samples.

Figure 9:
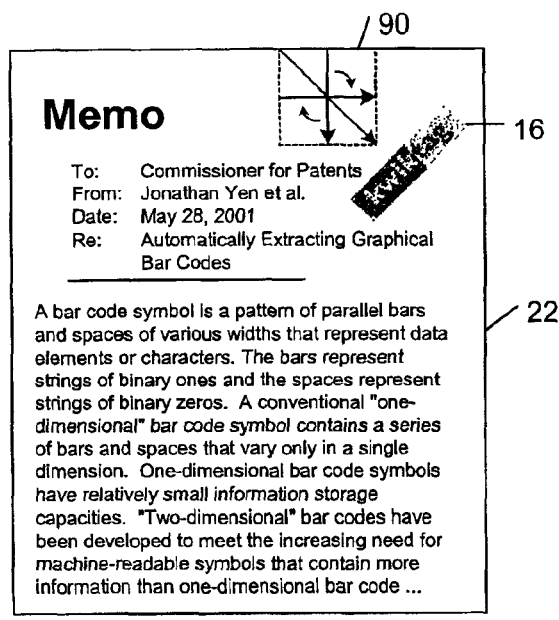
FIG. 9 is a diagrammatic view of the composite image of FIG. 3 and a kernel region that is processed along multiple rotational directions.

As shown in FIG. 9, in operation, for each position (m, n) within composite image 22, candidate selector 80 checks an N×N block 90 centered at (m, n) to determine whether that block is a template match candidate. In particular, for each of the preselected scan angles, the color planes (indexed by c) of the block 90 are projected (by inner product) on the isotropic and non-isotropic kernels (indexed by k) by linear match filter 84 of candidate selector 80, resulting in the projection values v[k][c](m, n). These values then are compared with the interval thresholds by thresholder 86 for each of the templates (τ=0, 1, . . . , L−1) that are contained in the parameter file. Among the tests that may be performed based upon the parameter file are: a color interval check; an intensity interval check; and a check whether the block corresponds to a local maximum of the energy function e:

$$e(m, n) = \Sigma_c \Sigma_k |v[k][c](m, n)|^2$$

If the block passes all of the above tests for a certain set of parameters, the block is considered to be a template match, in which case the block orientation interval Δγ is estimated and the match parameters i, τ, m, n, and Δγ are added to a match list that is passed to the geometric verifier 82.

In order to improve the detection speed of the detection module, the interval checks are performed in a pipelined way. For example, the color check for a kernel k is performed only if the color check for the previous kernel k-1 has passed. The intensity check is performed in the same pipelined manner only if the block passed all of the color checks. Finally, the local-maximum test is performed only if the block passed all of the previous tests.

Geometric verifier 82 verifies the template matches identified by candidate selector 80. In particular, geometric verifier 82 looks for combinations of $L_e$ template candidates in the match list that satisfy the following requirements:

All of the $L_e$ candidates correspond to the same graphical bar code training samples 74;

The $L_e$ candidates have different templates numbers τ, and the first two templates (τ=0 and τ=1) are present;

The distance between the first two templates (i.e., the position of each given by m, n) should match approximately that given in the parameter file; and The document coordinates of the templates with τ≧2 should match those given in the parameter file;

If a set of $L_e$ candidates in the match list satisfies the above requirements, then this set is declared to be a match by geometric verifier 82.

Further details regarding the operation and implementation of the detection system, including training module 62 and detection module 64, may be obtained from U.S. patent application Ser. No. 09/429,515, filed Oct. 28, 1999 by Renato Keshet et al., and entitled "System and Method for Counterfeit Protection."

Referring back to FIG. 5, if one or more graphical bar code candidate matches have been detected (step 100), the geometric verifier 82 passes to another program module of graphical bar code extractor 44 estimates of position coordinates for a pair of diagonal corners of the first detected graphical bar code candidate (step 102). From this information, graphical bar code extractor 44 may determine the orientation angle of the detected graphical bar code candidate and the position coordinates of the remaining pair of diagonal corners.

Figure 10:
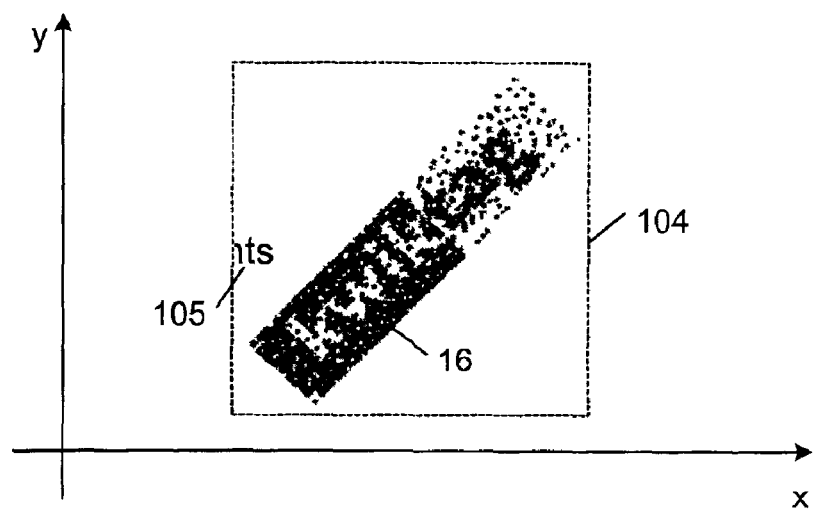
FIG. 10 is a diagrammatic view of an inclusive image region that has been cropped from the composite image of FIG. 3 and encompasses a detected graphical bar code candidate.

As shown in FIG. 10, after estimates of the corner positions of the first detected graphical bar code candidate have been computed, scanned image 48 may be cropped down in size to an inclusive image region 104 encompassing the detected graphical bar code candidate and, possibly, extraneous markings 105 contained in scanned image 48 (step 106). The size of the inclusive image region 104 may be determined based upon the size of the convolution kernel and the sub-sampling factor to achieve a desired tolerance level. Cropping the size of scanned image 48 down to the size of the inclusive region 104 reduces the amount of computations required for the subsequent processing steps.

Figure 11:
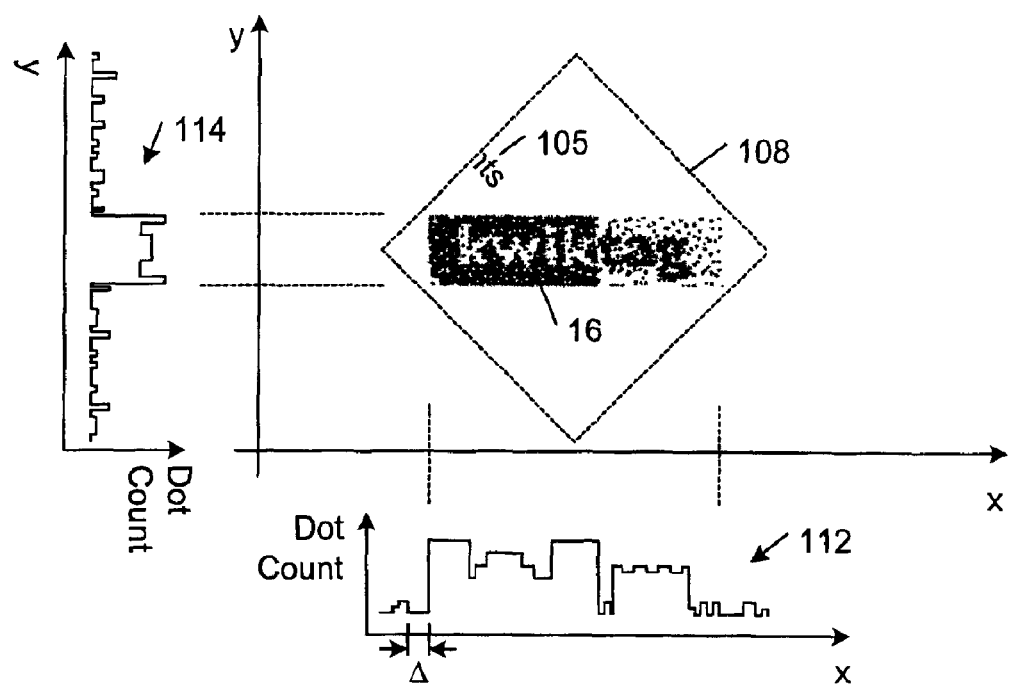
FIG. 11 is a diagrammatic view of the inclusive image region of FIG. 10 rotated to align the graphical bar code candidate with a pair of orthogonal axes, and a pair of histograms obtained by summing intensity values along the orthogonal axes.

Referring to FIG. 11, the inclusive image region 104 is de-skewed based upon the computed orientation angle of the detected graphical bar code candidate to produce a de-skewed inclusive image region 108 (step 110). Next, the de-skewed inclusive image region 108 is trimmed by a one-dimensional analysis that involves the computation of intensity histogram profiles 112, 114 (step 116). The intensity histogram profiles are computed by summing intensity values along orthogonal axes (x, y) corresponding to the computed angular orientation of the detected graphical bar code candidate. Non-graphical bar code regions may be trimmed from the left and right sides of de-skewed inclusive image region 108 by applying a threshold to intensity histogram profile 112. For example, the left and rights sides of de-skewed inclusive image region 108 may be trimmed at locations near the side edges of de-skewed inclusive image region where the histogram falls below a selected threshold value. In general, the thresholding algorithm begins at the center of de-skewed inclusive region 108 and moves out toward the left and right until the histogram drops below the selected threshold value. The selected threshold value may be empirically determined. In a similar way, non-graphical bar code regions may be trimmed from the top and bottom sides of de-skewed inclusive image region 108 by applying a threshold to intensity histogram profile 114.

In addition to applying thresholds to the dot density profiles 112, 114, the selection of trimming coordinate locations may be refined based upon knowledge of the dimensions of the graphical bar code training samples 74. For example, if after the thresholding step only one trimming location may be determined with a relatively high accuracy, the other trimming location may be selected to be the axis location that is spaced from the accurately determined trimming location by the corresponding axial dimension of the graphical bar code training samples. In some embodiments, regions of de-skewed inclusive image 108 that have dot counts greater than the applied threshold may be rejected (and treated as noise regions) if they are located more than a prescribed number of pixels ($\Delta$) beyond the rapidly rising regions of dot density profiles 112, 114, near the edges of de-skewed inclusive region 108. The prescribed number of pixels ($\Delta$) may be empirically determined.

In some embodiments, the decoding algorithm implemented by decoder 46 may require that the resulting trimmed graphical bar code candidate have a particular resolution. In these embodiments, the trimmed graphical bar code candidate may be scaled (up or down) to the appropriate resolution for decoding (step 118).

The scaled graphical bar code candidate then may be decoded by decoder 46 (step 120). If the graphical bar code candidate is decoded successfully (step 122), the extraction process stops (step 124). If the graphical bar code candidate cannot be decoded successfully (step 122), however, the extraction process is repeated for the next graphical bar code candidate that has been detected in scanned image 48, if any (step 100).

If no graphical bar code candidate has been detected in scanned image 48 or if the extraction process otherwise has failed to extract a graphical bar code that can be decoded by decoder 46 (step 100), the scanned image 48 may be rotated by an incremental amount (step 126) and the extraction process may be repeated (step 60). The amount by which scanned image 48 is rotated is determined to be less than the rotational angle between successive scans used during the detection process (see FIG. 9). For example, if target image extractor 44 is programmed to scan scanned image 48 over 64 possible rotational angles, the angle between successive scans is approximately 5.6°, in which case scanned image 48 may be incrementally rotated by an angle between 0° and 5.60° (e.g., 2.8°). After the scanned image 48 has been rotated a number of times ($R_{th}$) without a successful graphical bar code extraction (step 128), the graphical bar code extraction process is terminated (step 130).

In some embodiments, the training sample used by detection module 64 to detect a graphical bar code candidate may be changed in response to a failure to detect a graphical bar code candidate in the input image. For example, detection module 64 initially may attempt to detect a graphical bar code candidate based upon an un-rotated training sample. If the un-rotated training does not yield any candidates, a rotated version (e.g., rotated by 90°) of the training sample may be used to attempt to detect a graphical bar code candidate. One or more additional training samples may be used as the basis for detecting graphical bar code candidates in the input image before the process is terminated. The training sample may be changed before, after or in place of repeating the detection based upon a rotated version of scanned image 48 (step 126).

In sum, the above-described embodiments provide a novel approach for automatically extracting graphical bar codes from an input image. In particular, these embodiments enable a graphical bar code to be isolated from a composite image in a way that preserves the information-containing graphical modulations encoding the embedded information and avoid corrupting artifacts, such as markings contained in the composite image. The resulting extracted graphical bar code readily may be processed into a format that is tailored to the requirements of the decoding system, which may be particularly sensitive to noise, such as extraneous markings and image corruption. In addition, these embodiments robustly handle missed and incorrect detections.

The systems and methods described herein are not limited to any particular hardware or software configuration, but rather they may be implemented in any computing or processing environment, including in digital electronic circuitry or in computer hardware, firmware or software. The encoder, document processor, graphical bar code extractor and decoder modules may be implemented, in part, in a computer program product tangibly embodied in a machine-readable storage device for execution by a computer processor. In some embodiments, these modules preferably are implemented in a high level procedural or object oriented programming language; however, the algorithms may be implemented in assembly or machine language, if desired. In any case, the programming language may be a compiled or interpreted language. The encoding, document processing, extracting and decoding methods described herein may be performed by a computer processor executing instructions organized, e.g., into program modules to carry out these methods by operating on input data and generating output. Suitable processors include, e.g., both general and special purpose microprocessors. Generally, a processor receives instructions and data from a read-only memory and/or a random access memory. Storage devices suitable for tangibly embodying computer program instructions include all forms of non-volatile memory, including, e.g., semiconductor memory devices, such as EPROM, EEPROM, and flash memory devices; magnetic disks such as internal hard disks and removable disks; magneto-optical disks; and CD-ROM. Any of the foregoing technologies may be supplemented by or incorporated in specially-designed ASICs (application-specific integrated circuits).

Other embodiments are within the scope of the claims.

What is claimed is:

1. A method of extracting from an input image a graphical bar code-containing graphically encoded information, comprising:
   computing an angular orientation of the detected graphical bar code candidate; and
   trimming non-graphical bar code regions from the input image based upon estimated position coordinates for a detected graphical bar code candidate to produce a trimmed graphical bar code candidate for decoding, wherein the non-graphical bar code regions are trimmed based upon intensity histogram profiles obtained by summing intensity values along orthogonal axes corresponding to the computed angular orientation of the detected graphical bar code candidate.

2. The method of claim 1, further comprising cropping the input image before trimming based upon estimated position coordinates for a detected graphical bar code candidate to produce an inclusive image region encompassing the detected graphical bar code.

3. The method of claim 1, wherein the non-graphical bar code regions are trimmed based upon application of a threshold to the intensity histogram profiles.

4. The method of claim 1, wherein the non-graphical bar code regions are trimmed based upon a comparison of expected graphical bar code dimensions with the intensity histogram profiles.

5. The method of claim 1, further comprising de-skewing the detected graphical bar code candidate before the non-graphical bar code regions are trimmed.

6. The method of claim 1, further comprising extracting a second graphical bar code candidate detected in the input image in response to a determination that a first extracted graphical bar code candidate does not correspond to the graphical bar code.

7. The method of claim 1, further comprising decoding the graphical bar code candidate.

8. A method of extracting from an input image a graphical bar code containing graphically encoded information, comprising:
   rotating the input image and processing the rotated input image to detect a graphical bar code candidate in response to a failure to detect a graphical bar code candidate in the input image before rotation; and
   trimming non-graphical bar code regions from the input image based upon estimated position coordinates for a detected graphical bar code candidate to produce a trimmed graphical bar code candidate for decoding.

9. A method of extracting from an input image a graphical bar code containing graphically encoded information, comprising:
   detecting a graphical bar code candidate based upon a second training sample in response to a failure to detect a graphical bar code candidate in the input image based upon a first training sample; and
   trimming non-graphical bar code regions from the input image based upon estimated position coordinates for a detected graphical bar code candidate to produce a trimmed graphical bar code candidate for decoding.

10. The method of claim 9, wherein the second training sample is a rotated version of the first training sample.

11. A method of extracting from an input image a graphical bar code containing graphically encoded information, comprising:
    trimming non-graphical bar code regions from the input image based upon estimated position coordinates for a detected graphical bar code candidate to produce a trimmed graphical bar code candidate for decoding; and
    resolution scaling the trimmed graphical bar code candidate.

12. A system for extracting from an input image a graphical bar code containing graphically encoded information, comprising a graphical bar code extractor configured to:
    trim non-graphical bar code regions from the input image based upon estimated position coordinates for a detected graphical bar code candidate to produce a trimmed graphical bar code candidate for decoding, wherein the non-graphical bar code regions are trimmed based upon intensity histogram profiles obtained by summing intensity values along orthogonal axes corresponding to a computed angular orientation of the detected graphical bar code candidate.

13. The system of claim 12, wherein the graphical bar code extractor is configured to crop the input image before trimming based upon estimated position coordinates for a detected graphical bar code candidate to produce an inclusive image region encompassing the detected graphical bar code.

14. The system of claim 12, wherein the graphical bar code extractor is configured to de-skew the detected graphical bar code candidate before the non-graphical bar code regions are trimmed.

15. The system of claim 12, wherein the graphical bar code extractor is configured to extract a second graphical bar code candidate detected in the input image in response to a determination that a first extracted graphical bar code candidate does not correspond to the graphical bar code.

16. The system of claim 12, further comprising a decoder configured to decode the graphical bar code candidate.

17. A system for extracting from an input image a graphical bar code containing graphically encoded information, comprising a graphical bar code extractor configured to:
    rotate the input image and process the rotated input image to detect a graphical bar code candidate in response to a failure to detect a graphical bar code candidate in the input image before rotation; and
    trim non-graphical bar code regions from the input image based upon estimated position coordinates for a detected graphical bar code candidate to produce a trimmed graphical bar code candidate for decoding.

18. A system for extracting from an input image a graphical bar code containing graphically encoded information, comprising a graphical bar code extractor configured to:
    detect a graphical bar code candidate based upon a second training sample in response to a failure to detect a graphical bar code candidate in the input image based upon a first training sample; and
    trim non-graphical bar code regions from the input image based upon estimated position coordinates for a detected graphical bar code candidate to produce a trimmed graphical bar code candidate for decoding.

19. A computer program residing on a computer-readable medium and comprising computer-readable instructions for causing a computer to:

compute an angular orientation of the detected graphical bar code candidate; and trim non-graphical bar code regions from the input image based upon estimated position coordinates for a detected graphical bar code candidate to produce a trimmed graphical bar code candidate for decoding, wherein the non-graphical bar code regions are trimmed based upon intensity histogram profiles obtained by summing intensity values along orthogonal axes corresponding to the computed angular orientation of the detected graphical bar code candidate.

20. The computer program of claim 19, further comprising computer-readable instructions for causing the computer to crop the input image before trimming based upon estimated position coordinates for a detected graphical bar code candidate to produce an inclusive image region encompassing the detected graphical bar code.

21. The computer program of claim 19, wherein the non-graphical bar code regions are trimmed based upon application of a threshold to the intensity histogram profiles.

22. The computer program of claim 19, wherein the non-graphical bar code regions are trimmed based upon a comparison of expected graphical bar code dimensions with the intensity histogram profiles.

23. The computer program of claim 19, further comprising computer-readable instructions for causing the computer to de-skew the detected graphical bar code candidate before the non-graphical bar code regions are trimmed.

24. The computer program of claim 19, further comprising computer-readable instructions for causing the computer to extract a second graphical bar code candidate detected in the input image in response to a determination that a first extracted graphical bar code candidate does not correspond to the graphical bar code.

25. The computer program of claim 19, further comprising computer-readable instructions for causing the computer to decode the graphical bar code candidate.

26. A computer program residing on a computer-readable medium and comprising computer-readable instructions for causing a computer to:

rotate the input image and process the rotated input image to detect a graphical bar code candidate in response to a failure to detect a graphical bar code candidate in the input image before rotation; and trim non-graphical bar code regions from the input image based upon estimated position coordinates for a detected graphical bar code candidate to produce a trimmed graphical bar code candidate for decoding.

27. A computer program residing on a computer-readable medium and comprising computer-readable instructions for causing a computer to:

detect a graphical bar code candidate based upon a second training sample in response to a failure to detect a graphical bar code candidate in the input image based upon a first training sample; and trim non-graphical bar code regions from the input image based upon estimated position coordinates for a detected graphical bar code candidate to produce a trimmed graphical bar code candidate for decoding.

28. The computer program of claim 27, wherein the second training sample is a rotated version of the first training sample.

29. A computer program residing on a computer-readable medium and comprising computer-readable instructions for causing a computer to:

trim non-graphical bar code regions from the input image based upon estimated position coordinates for a detected graphical bar code candidate to produce a trimmed graphical bar code candidate for decoding; and resolution-scale the trimmed graphical bar code candidate.

* * * * *